United States Patent
Kuss

(10) Patent No.: US 7,885,537 B1
(45) Date of Patent: Feb. 8, 2011

(54) ENLARGED DISPLAY FOR A CAMERA VIEWFINDER

(76) Inventor: Mark L. Kuss, 15657 Cowface Rd., Lowell, AR (US) 72745

( * ) Notice: Subject to any disclaimer, the term of this patent is extended or adjusted under 35 U.S.C. 154(b) by 178 days.

(21) Appl. No.: 12/157,251

(22) Filed: Jun. 9, 2008

Related U.S. Application Data

(63) Continuation of application No. 11/120,097, filed on May 2, 2005, now abandoned.

(51) Int. Cl.
*G03B 13/02* (2006.01)
*H04N 5/222* (2006.01)

(52) U.S. Cl. .................. 396/374; 396/383; 348/333.06

(58) Field of Classification Search ................. 396/374, 396/383, 544; 348/333.01, 333.06, 333.07
See application file for complete search history.

(56) References Cited

U.S. PATENT DOCUMENTS

| | | | |
|---|---|---|---|
| 4,303,322 A | 12/1981 | Someya | 354/31 |
| 4,571,627 A | 2/1986 | Stempeck | 358/224 |
| 4,716,465 A * | 12/1987 | Meyer | 348/211.2 |
| 4,757,388 A | 7/1988 | Someya et al. | 358/224 |
| 5,179,478 A | 1/1993 | Aoki | 360/35.1 |
| 5,790,193 A * | 8/1998 | Ohmori | 348/375 |
| 6,295,088 B1 * | 9/2001 | Tsukahara et al. | 348/333.06 |
| 6,392,238 B1 * | 5/2002 | Vezard | 250/372 |
| 6,741,287 B1 * | 5/2004 | Fuchimukai et al. | 348/373 |
| 2002/0005907 A1 * | 1/2002 | Alten | 348/333.11 |
| 2002/0075563 A1 * | 6/2002 | Aizaki et al. | 359/363 |
| 2003/0189661 A1 * | 10/2003 | Flach et al. | 348/333.09 |

FOREIGN PATENT DOCUMENTS

JP          2003021864 A    *    1/2003

* cited by examiner

*Primary Examiner*—Rodney E Fuller
(74) *Attorney, Agent, or Firm*—Keisling & Pieper PLC; David B. Pieper

(57) ABSTRACT

A remote viewfinder display device using an image capturing device including a sensor positioned at an existing camera's viewfinder in communication with a remote display device which shows the viewfinder image at an alternative location to allow a photographer to frame the photograph in the viewfinder when the viewfinder is in an inaccessible or inconvenient position. The display can also provide a larger image for easier viewing. The remote viewfinder display device eliminates the constraints of a near eye view finder and provides for the ability to frame pictures with the alternatively positioned viewable screen or display independent of the existing camera's limited viewfinder position.

13 Claims, 4 Drawing Sheets

ENLARGED DISPLAY FOR A CAMERA VIEWFINDER

This application claims priority to and is a continuation of U.S. application Ser. No. 11/120,097, filed May 2, 2005, now abandoned.

BACKGROUND

1. Field of the Invention

The present invention relates generally to the field of camera accessories. In particular, the present invention relates to an add on image capturing device for an existing camera where the device allows the image presented in the existing camera's viewfinder to be visible from a remote position.

2. Description of the Known Art

As will be appreciated by those skilled in the art, modern film cameras use two basic types of viewfinders: separate lens set and through the lens viewing. Cameras using the separate lens sets are commonly referred to as viewfinder window cameras and through the lens viewing cameras are referred to as single lens reflex or SLR.

With the onset of digital cameras, a new type of viewfinder became common. The near view viewfinders were complimented with a far view screen which could be used to frame pictures and review the pictures stored in memory. As demand for higher quality cameras progressed, the first digital SLR cameras were developed. They use the same single lens reflex technology that made the 35 mm SLR the popular choice for professional and serious amateur photographers. The digital SLR cameras have a display screen for reviewing images in memory, but no ability to frame or compose an image on the display screen before capturing the image. The flexibility and ease of use of the far view screens on the point and shoot fixed lens digital cameras are far superior to the near view viewfinders on the SLR. However, the cameras utilizing the far view screens do not offer the photographic quality and flexibility of the interchangeable lens SLR. Thus, there is a need for an improvement in the art providing a far view screen for the existing SLR cameras.

A basic understanding of a typical existing camera is helpful in understanding the present invention. As shown in FIGS. 1 through 4, the typical camera body 500 includes generally a top 502, bottom 504, front 525, a right side 550, a left side 575, back 600, and a viewfinder 625. Immediately behind the viewfinder 625 is a viewfinder monitoring location 615 from which the image 105 in the viewfinder 625 may be seen. The problem with this type of camera 400 design is that the image 105 may only be seen through this viewfinder 625. If the camera 400 is placed up against a wall, down on the floor, or in any other extended position, the photographer will not be able to look through the viewfinder 625 to frame the image 105. The present invention is directed to solving this problem. It is also important to note that the viewfinder 625 generally has a viewfinder accessory connection 620 for attaching an eye seal or other viewfinder shading device and the camera body 500 generally includes a flash connection 503 used for connecting an accessory flash or other light source.

Several United States patents discuss electronics in the viewfinder of the camera. These include: U.S. Pat. No. 4,303,322, issued to Someya on Dec. 1, 1981 entitled "Electronic image pick-up device for a single-lens reflex camera having an interchangeable finder"; U.S. Pat. No. 4,571,627, issued to Stempeck on Feb. 18, 1986 entitled "Electronic viewfinder"; U.S. Pat. No. 4,757,388, issued to Someya, et al. on Jul. 12, 1988 entitled "Camera with electronic view finder viewable from either behind or in front of the camera"; and U.S. Pat. No. 5,179,478, issued to Aoki on Jan. 12, 1993 entitled "Electronic still camera attachment for a single-lens reflex camera recording an image of the focusing for plate through the viewfinder." Each of these patents is hereby incorporated by reference in their entirety.

U.S. Pat. No. 4,303,322 to Someya shows a removably attachable electronic image pick-up device for use with a single lens reflex camera, includes a casing which is shaped to fit in a receptacle on the camera body, which receptacle is otherwise used to seat a replaceable optical finder to display an object image. The device also includes a solid state image sensor arranged within the casing to produce photosignals which are processed by a control circuit to a prescribed form of picture signal, and the picture signal is then supplied to an outlet connector. Accordingly, when a display device or a video tape recorder is connected to the outlet connector, the object image can be displayed on the display device, or the image can be recorded on the video tape recorder.

U.S. Pat. No. 4,571,627 to Stempeck shows an electronic viewfinder for an electronic imaging still camera that may be selectively operated in either an electronic viewfinder mode in which electronic image data sensed by the photoresponsive sensing elements of the camera is transmitted to provide a video display of the scene within the field of view of the camera or, alternatively, an optic viewfinder mode in which the image defining scene light rays are optically transmitted for direct viewing of the scene within the field of view of the camera by the camera operator. The optic viewfinder mode of operation is automatically initiated during the time in which the image defining data is transmitted from the image sensing elements to the image data storing elements and the viewfinder is inoperative to provide its video display.

U.S. Pat. No. 4,757,388 to Someya shows a camera having an electronic finder for converting an object image formed by an image forming optical system of the camera to electrical signals and performing a display in response to said signals, apparatus is provided for supporting the electronic finder in such a way as to enable the electronic finder to be observed from either the front or the rear of the camera, and a control circuit is provided for changing the display state of the electronic finder in response to the support state of the supporting apparatus.

U.S. Pat. No. 5,179,478 to Aoki shows a combination of photographic film and electronic single-lens reflex camera. An electronic imaging and recording unit is detachably mounted on the single-lens reflex camera in place of the view finder and converts the image light into an electronic signal to be recorded on a magnetic disk. The exposure control for the electronic imaging is partially performed in the main camera body.

Thus, the prior tends to replace the existing viewfinder with an electronic viewfinder and does not provide a device or method to use the standard viewfinder on older nonreplaceable viewfinder cameras. The prior art fails to teach a device transporting the visible image from the output of an existing camera's viewfinder to a remote visual screen. The prior art additionally fails to teach a nonintegrated or separate camera accessory for transporting the visible image from a camera's viewfinder to a remote visual screen for use with existing SLR or viewfinder window cameras.

SUMMARY OF THE INVENTION

The present invention is directed to an image transporting device adapted for use with an existing camera having an existing viewfinder showing a viewfinder image at a viewfinder monitoring location. The invention includes a viewfinder image capturing device including a sensor positioned behind the existing window or lens of the viewfinder at the viewfinder monitoring location. The sensor is designed to receive the image displayed from the viewfinder and generate an image data signal that is forwarded to an image display device. The image display device includes a communication circuit and a display device. The communication circuit receives the image data signal and forwards it to the display device. The display device then presents a visual representation of the image at an alternative location to the original viewfinder monitoring location.

Other enhancements provided by the preferred mount on the viewfinder of the present invention include: a fastener for attaching the sensor of the present invention using an existing camera's accessory or flash mounting location; a wireless transmitter and receiver communication system or a cable connected communication system; a multiple position connection for attaching the display screen to the sensor housing to support the entire unit off of the existing camera.

A method is also provided for use with an existing camera and its original viewfinder. The method is directed to displaying a viewfinder image at an alternative location to the viewfinder monitoring location. The method includes the processes of (not necessarily in order): providing an image capturing device and an image display device; positioning the image capturing device at the viewfinder monitoring location; capturing the image at the viewfinder monitoring location; converting the image into image data; communicating the image data from the image capturing device to the image display device; converting the image data to a display image; and presenting the display image at another location outside of the viewfinder monitoring location.

Additional elements may include: supporting the image display device off of the image capturing device; wirelessly transmitting the image data; wirelessly receiving the image data; or providing a cable; connecting the image capturing device and the image display device.

As is noted by these descriptions, the device is placed on an existing camera's viewfinder to allow the photographer to see the image displayed in the existing viewfinder on a larger or remote screen or display. The device allows the photographer to eliminate the constraints of a near eye view finder without modifying the existing camera. The device also allows the photographer to frame pictures easily with the remote viewing screen or display.

It is an object of the present invention to provide a device for viewing an image displayed in a camera's viewfinder from a remote location.

Yet another object of the invention is to provide an efficient display modification for existing cameras.

Yet another object of the invention is to provide a device combining the single lens reflex technology of the SLR camera with the display and framing modification capabilities of digital point and shoot cameras.

Yet another object of the invention is to provide a device to easily view an image when using a SLR camera.

These and other objects of the present invention will become apparent by reference to the appended drawings, and the detailed description of preferred embodiments.

DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
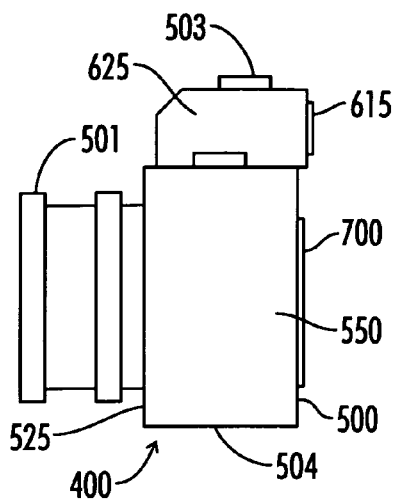
FIG. 1 shows a right side view of a typical prior art camera having a viewfinder and accessory attachment mounts.
Figure 2:
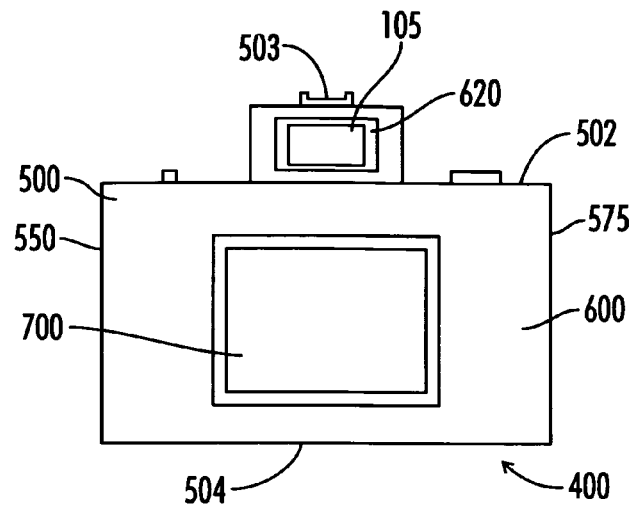
FIG. 2 shows back view of a typical prior art camera having a viewfinder and accessory attachment mounts.
Figure 3:
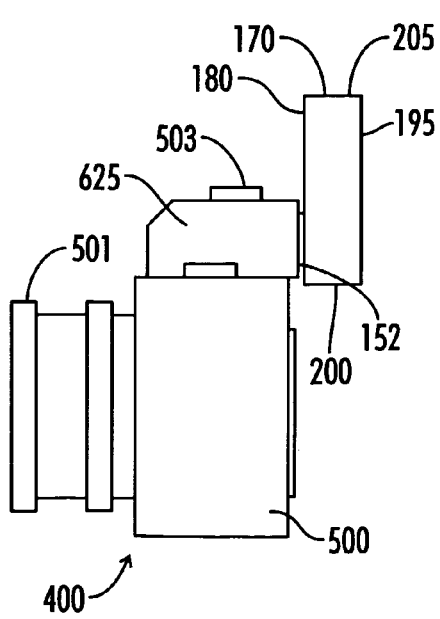
FIG. 3 is a right side view of an embodiment of the enlarged display for camera viewfinder.
Figure 4:
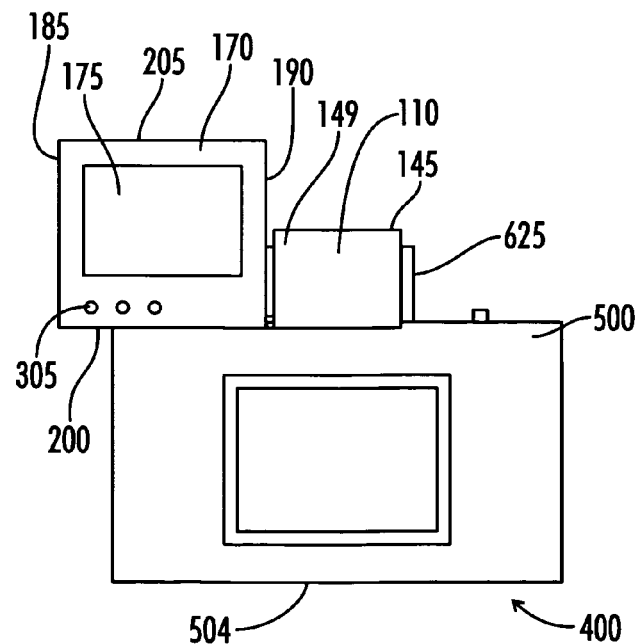
FIG. 4 is a back side view of an embodiment of the enlarged display for camera viewfinder.
Figure 5:
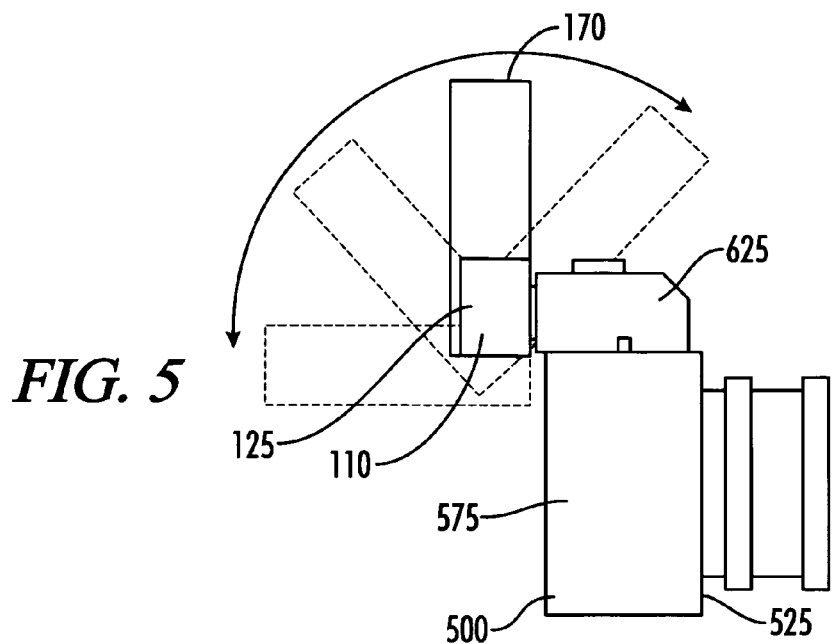
FIG. 5 shows a left side view of an embodiment of the enlarged display for camera viewfinder connected to a camera body with display rotation illustrated.
Figure 6:
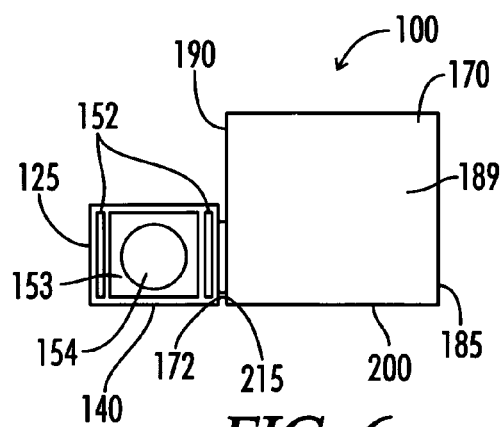
FIG. 6 shows a front view of the enlarged display for camera viewfinder.
Figure 7:
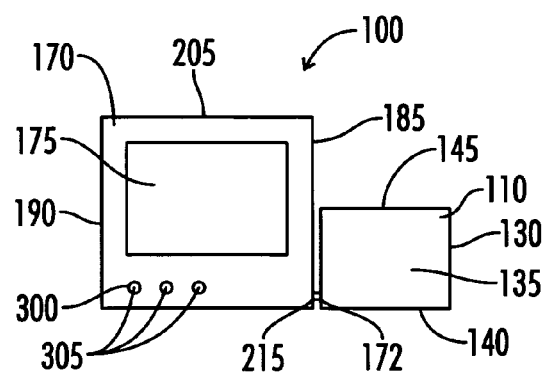
FIG. 7 shows back elevational view of the enlarged display for camera viewfinder.
Figure 8:
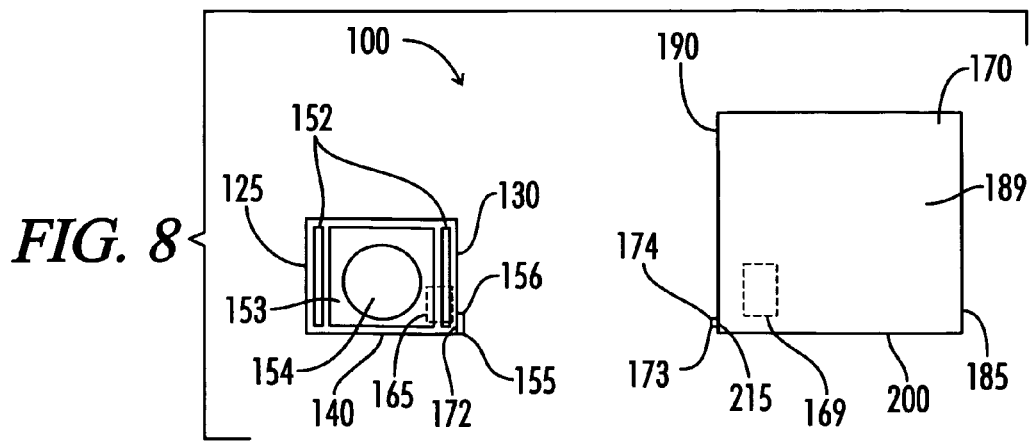
FIG. 8 shows a front view of an embodiment of the enlarged display for camera viewfinder with wireless image transmission.
Figure 9:
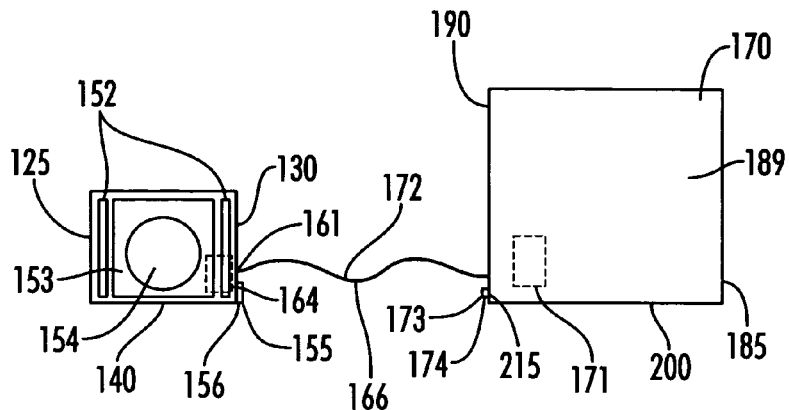
FIG. 9 shows a front view of an embodiment of the enlarged display for camera viewfinder with wired image transmission.

As shown in FIGS. 3 through 11 of the drawings, one exemplary embodiment of the present invention is generally shown as an image transporting apparatus 100. FIGS. 3 through 5, 10, and 11 show the image transporting apparatus mounted on a camera body 500 and FIGS. 6 through 9 show the image transporting apparatus 100 by itself. The image transporting apparatus 100 is constructed to have both an image capture device 110 and an image display device 170. Each of these is addressed in turn.

The image capture device 110 includes generally a front 120, a right side 130, a left side 125, a back 135, a top 145, and a bottom 140 constructed with a plastic or other material shell 149 surrounding the image capture device 110. At least one image sensor 160 is utilized to receive and capture the image 105 from the viewfinder 625 through an image viewing window 154. When mounted to the camera 400, the image viewing window 154 is positioned within the viewfinder monitoring location 615 for the viewfinder 625. Due to the small design of the present invention, the camera body 500 may still include additional features which are known or have been described in the art.

The image view window 154 of the image transporting apparatus 100 can be attached to the camera body 500 in order to maintain the image viewing window 154 in the viewfinder monitoring location 615. Any appropriate method such as fasteners, straps, additional moldings, glue, rivets, etc. may be utilized. In the preferred embodiment, the image capture device 110 is removably connected to the camera body 500 by a fastener 152 that is sized and shaped to fit the viewfinder accessory connection 620 on the camera 400. The front 120 of the image capture device 110 is then also fitted with a seal 153 for light and dust protection between the window image viewing window 154 and the viewfinder 625. The seal 153 can be composed of a variety of materials allowing for cushioning between the image capture device 110 and the camera body 500. As an alternative, it is also envisioned that the camera may be drilled to accept a screw or other type of fastener, or the image capture device 110 can be connected by an extended fastener 152 that mates with the accessory/flash connection 503 on top of the camera body 500.

Figure 10:
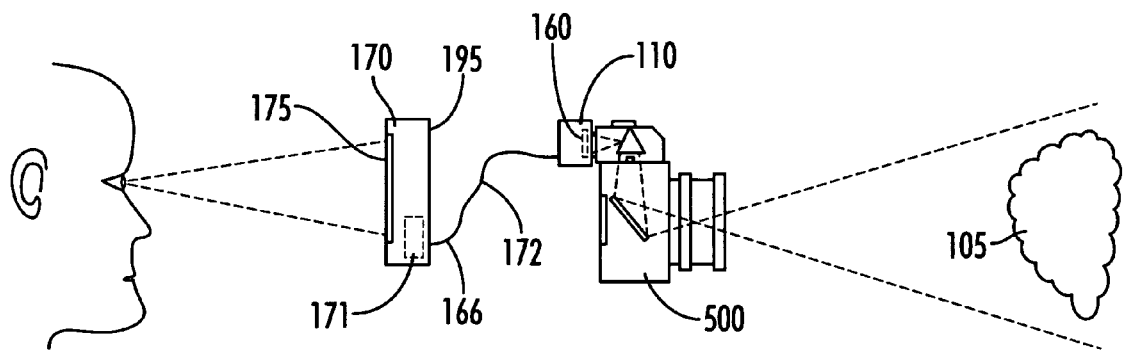
FIG. 10 shows a schematic of the electronic collection of an image using a wired embodiment of the enlarged display for camera viewfinder.
Figure 11:
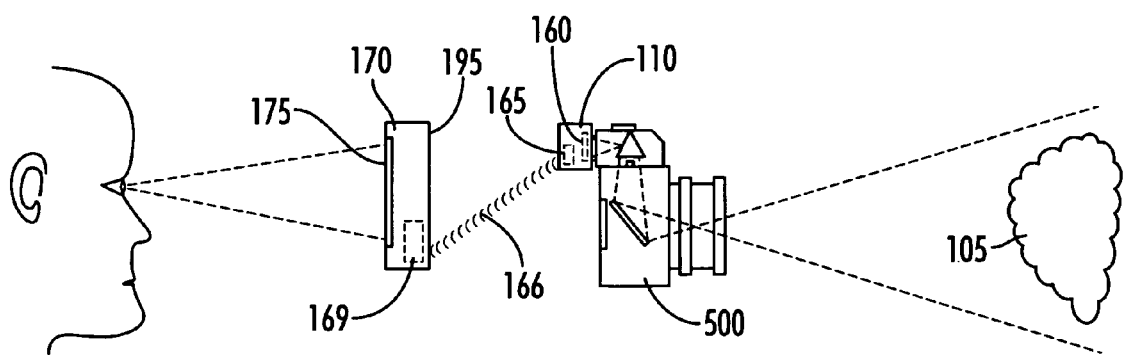
FIG. 11 shows a schematic of the electronic collection of an image, transmission to the wireless enlarged display for camera viewfinder, and display of the image collected from the viewfinder.

FIGS. 10 and 11 shows a schematic of the mechanism for capturing the image 105. Basically, the camera 400 is aimed at the item to be photographed and the image of that item is relayed through the viewfinder 625 on the camera 400 to the viewfinder monitoring location 615. The sensor 160 then picks up the image 105 and coverts the image 105 to image data signal 166. The image data receiver 171 then reads the image data signal 166 and forwards the image data signal 166. The mechanism for converting the captured image 105 into an electronic image data signal 166 is well known in the prior art and may take several different approaches to the particulars of the electronics. The present invention is not meant to be limited by this type of electronics design such that any of the capturing, conversion, and transmission system may be utilized. Two specific types of transmission systems are preferred for the present invention including either wired or wireless transmission of the image data signal 166.

The image capture device 110 transmits the captured image 105 to the image display device 170 by either wired or wireless transmission. The image capture device 110 may contain an outlet port 161 such as an RS232 serial port, firewire port, universal serial bus port, or ethernet cable port for transferring of the electronic image data signal 166 to the image display device 170. In another embodiment, the image capture device 110 may also contain a wireless transmitter 165, such as a light or magnetic radiation source commonly referred to as an infrared, amplitude modulation, or frequency modulation system. The wireless transmitter 165 is used for transmission of the electronic image data signal 166 to the image display device 170.

The image display device 170 includes generally a front 180, a right side 185, a left side 190, a back 195, a bottom 200, and a top 205. The image display device 170 may also be constructed with a plastic or other material shell 189 surrounding the image capture device 170. In one embodiment of the invention, the image transporting apparatus 100 includes a connective bridge 215 joined to the right side 185 of the image display device 170 and the left side 125 of the image capture device 110 permanently attaching the image display device 170 to the image capture device 110. In another embodiment, the image display device 170 features a fastener 173 adapted to connect to the bracket 155 located on the image capture device 110. In another embodiment, the fastener 173 includes a rotating mechanism 174 which can be manually motivated to rotate the image display device 170 when connected to the bracket 155 on the image capture device 110. An alternative construction would be to make the bracket 155 connected to the image capture device 110 include the rotating mechanism 156.

The image display device 170 is communicatively connected to the image capture device 110 by the image data receiver 171 using either the wired or wireless communication system. A schematic illustration of the wireless system is shown in FIG. 11. In this preferred embodiment, the electronic image data signal 166 of the captured image 105 is wirelessly transmitted from the image capture device 110 to the image display device 170 and collected by a wireless image data receiver 169. In another embodiment, the electronic image data signal 166 is simply transmitted by a durable transmission cable 172 connected to the image display device 170 such that the signal 166 is received by an outlet port 161 located on the image capture device 110. As previously described, the durable transmission cable 172 may be housed within the connective bridge 215. Regardless of the transmission method, the received version of image data signal 166 is forwarded to the image display screen 175. The image display screen 175 is used for viewing the captured image 105 sent through the electronic image data signal 166 received from the image capture device 110. The screen 175 is a typical liquid crystal display using well known voltage variances for producing the presented visual image 176.

In one embodiment of the invention, the image display device front 180 includes at least one button cavity 300 and a button 305 for control of working functions such as power, brightness, contrast, and other typical screen controls. Additional button cavities 300 and buttons 305 may be provided for these features. Buttons 305 are constructed such that they can be motivated by a human finger or small utensil.

Figure 12:
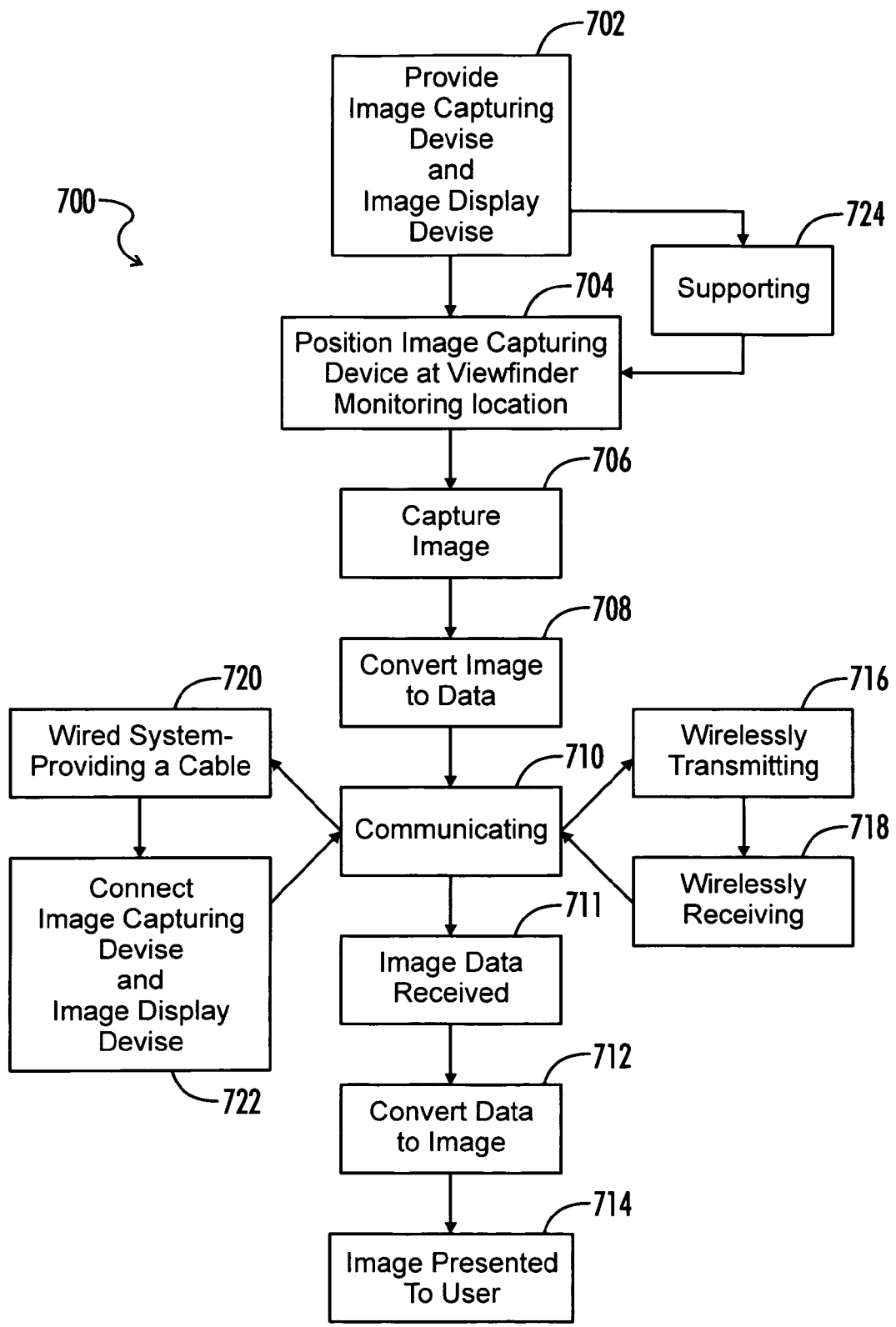
FIG. 12 shows a flow chart of the method of the present invention.

As shown in FIG. 12 of the drawings a remote display method 700 is shown for use with a camera 400 having a viewfinder 625 displaying a viewfinder image 105 at a viewfinder monitoring location 615. The method begins by providing 702 an image capturing device and an image display device and positioning 704 the image capturing device at the viewfinder monitoring location. Once image capturing device is positioned, the user may continue by capturing 706 the image at the viewfinder monitoring location and converting 708 the image into image data that is communicated 710 to the image display device. Once the image data is received 711, the image data is converted 712 to a display image and presented 714 to the user at another location outside of the viewfinder monitoring location.

Additional elements of the method may include supporting 724 the image display device off of the image capturing device or providing different communication pathways. The communication pathways are implemented for a wireless system by wirelessly transmitting 716 the image data and then wirelessly receiving 718 the image data. Alternatively, a wired system may be implemented by providing 720 a cable and then connecting 722 the image capturing device and the image display device with the cable.

Reference numerals used throughout the detailed description and the drawings correspond to the following elements:
viewfinder image 105
image transporting apparatus 100
image capture device 110
capture housing front 120
capture housing right side 130
capture housing left side 125
capture housing back 135
capture housing top 145
capture housing bottom 140
material shell 149
capture housing fastener 152
image capture housing seal 153
image capture window 154
capture to display bracket 155
rotating mechanism 156
image sensor 160
outlet port 161
a wired transmitter 164
a wireless transmitter 165
image data signal 166
wireless image receiver 169
image display device 170
display receiver 171
durable transmission cable 172
capture to display fastener 173 positionable rotating mechanism 174
image display screen 175
presented visual image 176
display housing front 180
display housing right side 185
display housing left side 190
display housing back 195
display housing bottom 200
display housing top 205
material shell 189
connective bridge 215
button cavity 300
button 305
camera 400
camera body 500
top 502
flash connection 503
bottom 504
front 525
right side 550
left side 575
back 600
viewfinder 625
viewfinder monitoring location 615
viewfinder accessory connection 620
remote display method 700
providing capture and display devices 702
positioning 704
capturing 706
converting image to data 708
communicating 710
received 711
converting data to image 712
presenting 714
supporting 716
wirelessly transmitting 718
wirelessly receiving 720
providing a cable 722
connecting 724

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

What is claimed is:

1. An image transporting apparatus adapted for use with a camera having a rear viewfinder showing an image at a viewfinder monitoring location and a camera body with a viewfinder accessory connection mounted on the camera body, the apparatus comprising:

a viewfinder image capturing device including a sensor positioned at the viewfinder monitoring location, the sensor receiving the image displayed from the viewfinder and generating an image data signal, the viewfinder image capturing device further including a bracket;

an image display device including a communication circuit and a display device, the communication circuit receiving the image data signal and the display device displaying the image at an alternative location to the viewfinder monitoring location, the image display device further including a rotating mechanism connected to the bracket rotatably supporting the image display device off of the viewfinder image capturing device; and a support adapter connected to the viewfinder image capturing device, wherein the support adapter supports the viewfinder image capturing device and the image display device off of the camera body using the viewfinder accessory connection.

2. The apparatus of claim 1, the viewfinder image capturing device further comprising:

a transmitter adapted to convert the image data signal to a wireless signal.

3. The apparatus of claim 2, the image display device further comprising:

a wireless receiver adapted to receive the wireless signal and generate the image data signal in the image display device.

4. The apparatus of claim 1, the image capturing device further comprising:

a cable outlet port communicatively connected to the sensor.

5. The apparatus of claim 1, further comprising:

a cable communicatively connecting the image capturing device to the image display device.

6. The apparatus of claim 1, the image display device further comprising:

a cable input port adapted to receive the cable.

7. An image transporting apparatus adapted for use with a camera having a body including a viewfinder showing an image at a viewfinder monitoring location, the viewfinder including a viewfinder accessory connection the apparatus comprising:

an image capturing means for capturing an image displayed within the viewfinder of the camera, converting the image to data, and sending the image data, the image capturing means including an attachment means for supporting the image capturing means off of the viewfinder accessory connection of the camera, the attachment means including a bracket;

an image displaying means for receiving the image data and converting the image data into a displayed image at an alternative position to the viewfinder monitoring location, the image displaying means supported off of a rotating mechanism connected to the bracket of the image capturing means.

8. The apparatus of claim 7, the image capturing means further comprising:

a wireless communication means for transmitting the image data.

9. The apparatus of claim 8, the image displaying means further comprising:

a wireless receiver means for receiving the image data.

10. The apparatus of claim 7, the image capturing means further comprising:

a communicative cable attachment means for wired communication.

11. The apparatus of claim 10, the image displaying means further comprising:

a communicative cable attachment means for wired communication.

12. A remote display method for use with a camera having a body including a viewfinder accessory connection and a viewfinder displaying a viewfinder image at a viewfinder monitoring location, the method comprising:

providing an image capturing device and an image display device;

rotatably mounting the image capturing device to the image display device using a rotating mechanism;

mounting the image capturing device and the image display device off of the viewfinder accessory connection of the camera and positioning the image capturing device at the viewfinder monitoring location;

capturing the image at the viewfinder monitoring location;

converting the image into image data;

communicating the image data from the image capturing device to the image display device;

converting the image data to a display image; and presenting the display image at another location outside of the viewfinder monitoring location.

13. The method of claim 12 communicating further comprising:

wirelessly transmitting the image data; and wirelessly receiving the image data.

* * * * *